United States Patent
Appelman et al.

(10) Patent No.: US 11,513,526 B2
(45) Date of Patent: *Nov. 29, 2022

(54) METHOD OF NAVIGATING A VEHICLE AND SYSTEM THEREOF

(71) Applicant: Elta Systems LTD., Ashdod (IL)

(72) Inventors: Dina Appelman, Bat-Yam (IL); Ofir Cohen, Tzelafon (IL)

(73) Assignee: Elta Systems LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/973,843

(22) PCT Filed: Aug. 30, 2018

(86) PCT No.: PCT/IL2018/050966
§ 371 (c)(1),
(2) Date: Dec. 10, 2020

(87) PCT Pub. No.: WO2020/044325
PCT Pub. Date: Mar. 5, 2020

(65) Prior Publication Data
US 2021/0181752 A1    Jun. 17, 2021

(51) Int. Cl.
*G05D 1/02* (2020.01)
*G01C 21/00* (2006.01)
(Continued)

(52) U.S. Cl.
CPC .......... *G05D 1/0214* (2013.01); *G01C 21/32* (2013.01); *G01C 21/3807* (2020.08);
(Continued)

(58) Field of Classification Search
CPC .... G05D 1/0214; G05D 1/0231; G05D 1/027; G05D 1/0274; G05D 1/0278;
(Continued)

(56) References Cited

U.S. PATENT DOCUMENTS 5,677,836 A    10/1997 Bauer
6,037,893 A    3/2000 Lipman
(Continued)

FOREIGN PATENT DOCUMENTS

CN    103455034 A    12/2013
CN    104501794 A    4/2015
(Continued)

OTHER PUBLICATIONS

Machine Translation: WO-2018176472-A1 (year:2018).*
(Continued)

*Primary Examiner* — Aaron L Troost
*Assistant Examiner* — Connor L Knight
(74) *Attorney, Agent, or Firm* — Dorsey & Whitney LLP

(57) ABSTRACT

A system and method of navigating a vehicle, the vehicle comprising a scanning device and a self-contained navigation system (SCNS) operatively connected to a computer, the method comprising: operating the scanning device for repeatedly executing a scanning operation, each operation includes scanning an area surrounding the vehicle, thereby generating respective scanning output data; operating the computer for generating, based on the scanning output data, a relative map representing at least a part of the area, the map having known dimensions and being relative to a position of the vehicle, wherein the map comprises cells, each cell classified to a class from at least two classes, comprising traversable and non-traversable, and characterized by dimensions equal or larger than an accumulated drift value of the SCNS; wherein non-traversable cells correspond to identified obstacles; receiving SCNS data and updating a position of the vehicle relative to the cells based on the SCNS data.

32 Claims, 8 Drawing Sheets

(51) Int. Cl.
  *G01C 21/32* (2006.01)
  *G06K 9/00* (2022.01)
  *G06V 20/58* (2022.01)
  *G05D 1/10* (2006.01)

(52) U.S. Cl.
  CPC .......... *G05D 1/027* (2013.01); *G05D 1/0231* (2013.01); *G05D 1/0274* (2013.01); *G05D 1/0278* (2013.01); *G06V 20/58* (2022.01); *G05D 1/0206* (2013.01); *G05D 1/101* (2013.01)

(58) Field of Classification Search
  CPC .... G05D 1/0206; G05D 1/101; G05D 1/0044; G05D 1/024; G06V 20/58; G08G 1/165; G08G 1/166; G01C 21/32; G01C 21/3807; G01C 21/3826
  See application file for complete search history.

(56) References Cited

U.S. PATENT DOCUMENTS

| | | | |
|---|---|---|---|
| 6,477,465 | B1 | 11/2002 | Mccall et al. |
| 7,272,474 | B1 * | 9/2007 | Stentz ............... G01C 7/04 701/28 |
| 7,584,020 | B2 | 9/2009 | Bruemmer et al. |
| 7,756,615 | B2 * | 7/2010 | Barfoot ............. G05D 1/0297 701/25 |
| 8,364,334 | B2 | 1/2013 | Au et al. |
| 8,649,930 | B2 | 2/2014 | Reeve et al. |
| 9,234,618 | B1 | 1/2016 | Zhu et al. |
| 11,023,847 | B2 | 6/2021 | Skaaksrud |
| 2006/0190163 | A1 | 8/2006 | Anderson |
| 2007/0005306 | A1 | 1/2007 | Foessel |
| 2007/0193798 | A1 | 8/2007 | Allard et al. |
| 2008/0059015 | A1 * | 3/2008 | Whittaker ............. G08G 1/161 901/1 |
| 2010/0066587 | A1 | 3/2010 | Yamauchi et al. |
| 2011/0178668 | A1 | 7/2011 | Tanaka et al. |
| 2017/0299397 | A1 | 10/2017 | Ichikawa et al. |
| 2020/0159227 | A1 | 5/2020 | Cohen et al. |
| 2021/0025143 | A1 | 1/2021 | Cohen et al. |

FOREIGN PATENT DOCUMENTS

| | | | | |
|---|---|---|---|---|
| CN | 104777499 | A | | 7/2015 |
| CN | 110567884 | A * | 12/2019 | ............ G01J 3/0264 |
| DE | 19904097 | B4 * | 6/2006 | |
| EP | 2338029 | A4 | | 7/2012 |
| EP | 2203718 | B1 * | 3/2014 | ............ G01C 21/32 |
| KR | 101772977 | B1 * | 8/2017 | |
| WO | 2009053406 | A1 | | 4/2009 |
| WO | WO-2016165704 | A2 * | 10/2016 | ............ B60W 40/06 |
| WO | WO-2018176472 | A1 * | 10/2018 | ............ G01S 13/00 |

OTHER PUBLICATIONS

Machine Translation: WO-2016165704-A2 (year:2016).*
Machine Translation: KR-101772977-B1 (year:2017).*
Machine Translation: CN-110567884-A (year:2019).*
Machine Translation: DE-19904097-B4 (year:2006).*
Lee, et al., "Consecutive Scanning Based Obstacle Detection and Probabilistic Navigation of a Mobile Robot", Intelligent Robots and Systems, Proceedings. 2003 IEEE/RSJ International Conference vol. 4, Oct. 2003, pp. 3510-3515.
Miguel, et al., "A Comparison of Three Uncertainty Calculi for Building Sonar-Based Occupancy Grids", Robotics and Autonomous Systems, 2001, pp. 201-209.
Procopio, et al., "Learning Terrain Segmentation with Classifier Ensembles for Autonomous Robot Navigation in Unstructured Enviroments", Journal of Field Robotics, vol. 26 No. 2, 2009, pp. 145-175.
International Search Report and Written Opinion for International application No. PCT/IL2018/050966 dated Jan. 30, 2019, 12 pages.
Lee, Jae-Yong , et al., "Consecutive Scanning based Obstacle Detection and Probabilistic Navigation of a Mobile Robot", Proceedings of the 2003 IEEE/RSJ Intl. Conference on Intelligent Robots and Systems Las Vegas, NV, Oct. 2003, pp. 3510-3515.
Procopio, Michael , et al., "Learning Terrain Segmentation with Classifier Ensembles for Autonomous Robot Navigation in Unstructured Environments", Journal of Field Robotics; vol. 26 No. 2, 2009, pp. 145-175.
Ribo, Miguel , et al., "A comparison of three uncertainty calculi for building sonar-based occupancy grids", Robotics and Autonomous Systems; vol. 35, 2001, pp. 201-209.

* cited by examiner

METHOD OF NAVIGATING A VEHICLE AND SYSTEM THEREOF

TECHNICAL FIELD

The presently disclosed subject matter relates to unmanned vehicles, and more particularly, to navigation of unmanned vehicles.

BACKGROUND

An unmanned ground vehicle (UGV), also referred to as an uncrewed vehicle is a motorized machine that travels by integrating sensory data with computer-based decision making for the purpose of autonomously driving the vehicle.

One issue related to UGV operation is autonomous navigation. When navigating the vehicle, information with respect to obstacles which are located within the traversed area is used for determining a route that avoids the obstacles to enable safe travel of the vehicle through the area. An obstacle can be any area or object which should be avoided. For example, an obstacle can be an object or area which either blocks or endangers the vehicle, e.g. slopes, holes in the ground, water reservoirs, walls, big rocks, overhead obstacles e.g., bridges, etc. Obstacles can also include any area which is desired to be avoided (e.g. noxious areas, habitat areas which should be avoided for ecological or animal conservation reasons, populated areas which should be avoided for safety reasons, etc.).

GENERAL DESCRIPTION

The disclosure relates to navigation of a vehicle (e.g. UGV) within an area, in the presence of obstacles. It has been known in the art to navigate within an area in the presence of obstacles by generating a map of the area comprising indications of obstacles and optionally a target location, and tracking the location of the UGV within the map as the UGV advances, according to indications received from a positioning system, such as a Global Positioning System (GPS). However, GPS measurements may be inaccurate and may suffer from jitter and delayed updates. In an area dense with obstacles, such inaccuracies may be harmful as they may cause a UGV to get to dangerous proximity or even collide with an obstacle. For example, GPS based location may erroneously indicate a safe distance from an obstacle, while the real distance may be much smaller. Tracking the location of the UGV using a self-contained navigation system (such as an INS) alone may account for significant errors resulting from accumulated drift as the UGV advances, which may also lead to dangerous or other undesired situations.

A common navigation technique is based on the integration of GPS and INS data output, where the INS provides effective navigation data for a short time in order to compensate for GPS discontinuity. However, although this technique provides some remedy to GPS discontinuity it still suffers from the inaccuracies and jigger that characterize GPS navigation and is therefore likewise often insufficiently accurate for obstacle avoidance.

Another disadvantage of GPS navigation is that it cannot be used where satellite communication is unavailable. For example, GPS is many times inapplicable where the vehicle is traveling indoors or underground.

According to some examples of the disclosed subject matter, the UGV is tracked using a map of the environment. The map can be generated and repeatedly updated by scanning the area surrounding the UGV using one or more scanning devices operated from onboard the UGV. The resulting map is thus generated relative to the UGV (sometimes referred to herein as a "relative map"), e.g. the map represents an area surrounding the UGV. In some examples the map is generated such that the UGV is at its center.

In addition to avoiding obstacles, in some cases the UGV may receive or determine a destination or a path from a current location to a target location (destination). The UGV can advance towards the destination in accordance with the path (optionally, but not necessarily using GPS), while using the generated relative map for tracking its location relative to the scanned environment and avoiding obstacles.

The position of the UGV relative to the scanned environment within the map (including between successive updates of the map performed based on readings received from the scanning device) is tracked based on readings received from an INS. Updating the relative location between the UGV and an element in the surrounding environment (e.g. obstacle) that was detected in a previous scan but is not seen in a current scan is also performed in accordance with advancement of the UGV, based on INS data.

As mentioned above. INS suffers from an accumulating drift that renders INS position determination severely unreliable over time. The presently disclosed subject matter includes a method of mapping an area using a scanning device and navigating the UGV within the mapped area using INS while overcoming the problem of INS drift.

The (relative) map can comprise a grid of cells, wherein each cell represents part of the mapped area. According to examples of the presently disclosed subject matter, the size of the cells is selected to be equal or larger than the maximal INS drift over a certain predefined traversed distance. Furthermore, the map advances with the vehicle such that as the vehicle progresses new areas are included at one end of the map in the direction of its progress and other areas at the opposite end of the map are excluded from the map.

Thus, while advancing towards the target location, possibly along a predefined path leading thereto, the UGV navigates through the traversed area and avoids obstacles by repeatedly scanning the area surrounding the UGV, generating a relative map of the area based upon the scanning output data, and using an INS for updating the position of the UGV relative to the mapped environment and navigating the UGV according to the mapping data.

One aspect of the disclosed subject matter relates to a method of navigating a vehicle, the vehicle comprising a scanning device and a self-contained navigation system (SCNS) being operatively connected to a computer, the method comprising: operating the scanning device for repeatedly executing a scanning operation, where each scanning operation includes scanning an area surrounding the vehicle, to thereby generate respective scanning output data; operating the computer for generating, based on the scanning output data from multiple scanning operations, a relative map representing at least a part of the area, the relative map having known dimensions and being relative to a position of the vehicle, wherein the relative map comprises cells, each cell being classified to a class selected from at least two classes, comprising traversable and non-traversable, and characterized by dimensions equal or larger than an accumulated drift value of the SCNS over a predefined distance; wherein non-traversable cells correspond to obstacles identified in the scanning output data; receiving SONS data and updating a position of the vehicle relative to the cells based on the SCNS data.

In addition to the above features, the method according to this aspect of the presently disclosed subject matter can optionally comprise one or more of features (i) to (xxiii) listed below, in any technically possible combination or permutation:

i). Wherein the relative map includes non-traversable cells that correspond to obstacles detected in scanning output data of a previous scanning operation from the multiple scanning operations and not detected in a scanning output data of a later scanning operation from the multiple scanning operations, while still being located within the scanned area.

ii). wherein updating a position of the vehicle relative to the cells based on the SCNS data includes updating the position of the vehicle relative to obstacles detected in scanning output data of a previous scanning operation from the multiple scanning operations and not detected in scanning output data of a current scanning operation from the multiple scanning operations, while the obstacle is still located within the scanned area.

iii). generating instructions for controlling the vehicle movement within the area based on the relative map, to thereby avoid non-traversable cells, wherein the instruction are generated autonomously by a navigation system onboard the vehicle, or by an operator controlling the vehicle.

iv). Wherein the SCNS is any one of inertial navigation system; Simultaneous localization and Mapping (SLAM); and odometer navigation systems.

v). Wherein the vehicle is any one of: unmanned ground vehicle; manned ground vehicle; unmanned aerial vehicle; manned aerial vehicle; unmanned marine vehicle; and maimed marine vehicle.

vi). Wherein the relative map is generated by accumulating scanning output data from a plurality of scanning operations.

vii). Wherein the relative map is generated by accumulating scanning output data in an advancement direction of the vehicle as the vehicle advances into the area, and omitting representation of areas in an opposite direction.

viii). Wherein the method further comprises, navigating the vehicle along a global path leading to a target destination and updating the path based on the relative map in order to avoid obstacles.

ix). Wherein navigation along the global path is executed using GPS.

x). Wherein navigation along the global path is executed using computer vision.

xi). Wherein the method further comprises, aligning between a global map comprising the global path leading to a destination and the relative map thereby providing a combined map leading to the destination along the updated global path which has been updated based on the relative map.

xii). Wherein aligning between the global map and the relative map comprises:
  using assigned time tags for temporally aligning between an instance of the global map and an instance of the relative map;
  spatially aligning between the global map and the relative map by matching between the position of the UGV in the global map and the position of the UGV in the relative map.

xiii). Displaying a graphical representation of the combined map including an indication of non-traversable cells, position of the vehicle, and the updated global path.

xiv). Wherein the predefined distance is selected to exceed a maximal distance expected to be travelled by the vehicle between consecutive updates of the relative map.

xv). Wherein the predefined distance is equal to a dimension of the area represented by the relative map.

xvi). Wherein the predefined distance is equal to half of a dimension of the part of the area represented by the relative map.

xvii). Wherein the predefined distance is equal to a diagonal connecting opposite vertexes of the relative map.

xviii). Wherein the predefined distance is determined in accordance with a relation between an update rate of the relative map, and a maximal or expected velocity of the vehicle.

xix). Wherein the area dimensions are determined in accordance with a scanning distance of the scanning device.

xx). Wherein the area is a square having an edge of up to double the scanning distance of the scanning device.

xxi). Wherein an obstacle detected during a scanning operation is indicated on the relative map as a non-traversable cell, and wherein a non-traversable cell representing an obstacle that is detected in a scan and is not detected in at least one subsequent scans, is indicated on the relative map as non-traversable, for at least, one further map update.

xxii). The method further comprising, generating a graphical representation of the relative map and displaying the graphical representation on a display device, to thereby enable an operator to control the vehicle while avoiding obstacles based on the graphical representation.

xxiii). Wherein the graphical representation is a 2.5 dimensional or 3 dimensional representations of the relative map.

According to another aspect of the presently disclosed subject matter there is provided a system mountable on vehicle, comprising:

a scanning device for scanning an area surrounding the vehicle, to thereby provide scanning output data providing information about distances between objects in the area and the vehicle in a multiplicity of directions;

a self-contained navigation system (SCNS) for providing data indicative of a current position of the vehicle relative to a previous position; and at least one processor;

the scanning device is operable to repeatedly execute a scanning operation, where each scanning operation includes scanning an area surrounding the vehicle, to thereby generate respective scanning output data;

the at least one processor is configured to:

generate, based on the scanning output data from multiple scanning operations, a map representing at least a part of the area, the map having known dimensions and being relative to a position of the vehicle, wherein the map comprises cells, each cell is classified to a class selected from a group consisting of traversable and non-traversable, and characterized by dimensions equal or larger than an accumulated drift value of the SCNS over a predefined distance; wherein non-traversable cells correspond to obstacles identified in the scanning output data;

receive SCNS data and update a position of the vehicle relative to the cells based on the SCNS data.

According to another aspect of the presently disclosed subject matter there is provide a vehicle, comprising a system comprising:

a scanning device for scanning an area surrounding the vehicle, to thereby provide scanning output data providing information about distances between objects in the area and the vehicle in a multiplicity of directions;

a self-contained navigation system (SCNS) for providing data indicative of a current position of the vehicle relative to a previous position; and at least one processor;

the scanning device is operable to repeatedly execute a scanning operation, where each scanning operation includes scanning an area surrounding the vehicle, to thereby generate respective scanning output data;

the at least one processor is configured to:

generate, based on the scanning output data from multiple scanning operations, a map representing at least a part of the area, the map having known dimensions and being relative to a position of the vehicle, wherein the map comprises cells, each cell is classified to a class selected from a group consisting of traversable and non-traversable, and characterized by dimensions equal or larger than an accumulated drift value of the SCNS over a predefined distance; wherein non-traversable cells correspond to obstacles identified in the scanning output data;

receive SCNS data and update a position of the vehicle relative to the cells based on the SCNS data.

According to yet another aspect of the presently disclosed subject matter there is provided a computer program product comprising a computer readable storage medium retaining program instructions, which program instructions when read by a processor, cause the processor to perform a method of navigation a vehicle, comprising:

receiving scanning output data, generated in multiple scanning operations executed by a scanning device located on-board the vehicle and operable to scan an area surrounding the vehicle;

using the scanning output data for generating, a relative map representing at least a part of the area, the relative map having known dimensions and being relative to a position of the vehicle, wherein the relative map comprises cells, each cell being classified to a class selected from at least two classes, comprising traversable and non-traversable, and characterized by dimensions equal or larger than an accumulated drift value of the SCNS over a predefined distance; wherein non-traversable cells correspond to obstacles identified in the scanning output data; receiving SCNS data and updating a position of the vehicle relative to the cells based on the SCNS data.

The UGV, the system and the computer program products disclosed in accordance with the presently disclosed subject matter can optionally comprise one or more of features (i) to (xxiii) listed above, mutatis mutandis, in any desired combination or permutation.

According to further aspects of the presently disclosed subject matter there is provided a method, a system and a computer program product of generating a relative map based on scanning output data, the method comprising: operating the scanning device for repeatedly executing a scanning operation, where each scanning operation includes scanning an area surrounding the vehicle, to thereby generate respective scanning output data; operating the computer for generating, based on the scanning output data from multiple scanning operations, a relative map representing at least a part of the area, the relative map having known dimensions and being relative to a position of the vehicle, wherein the relative map comprises cells, each cell being classified to a class selected from at least two classes, comprising traversable and non-traversable, and characterized by dimensions equal or larger than an accumulated drift value of the SCNS over a predefined distance; wherein non-traversable cells correspond to obstacles identified in the scanning output data; receiving SCNS data and updating a position of the vehicle relative to the cells based on the SCNS data.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
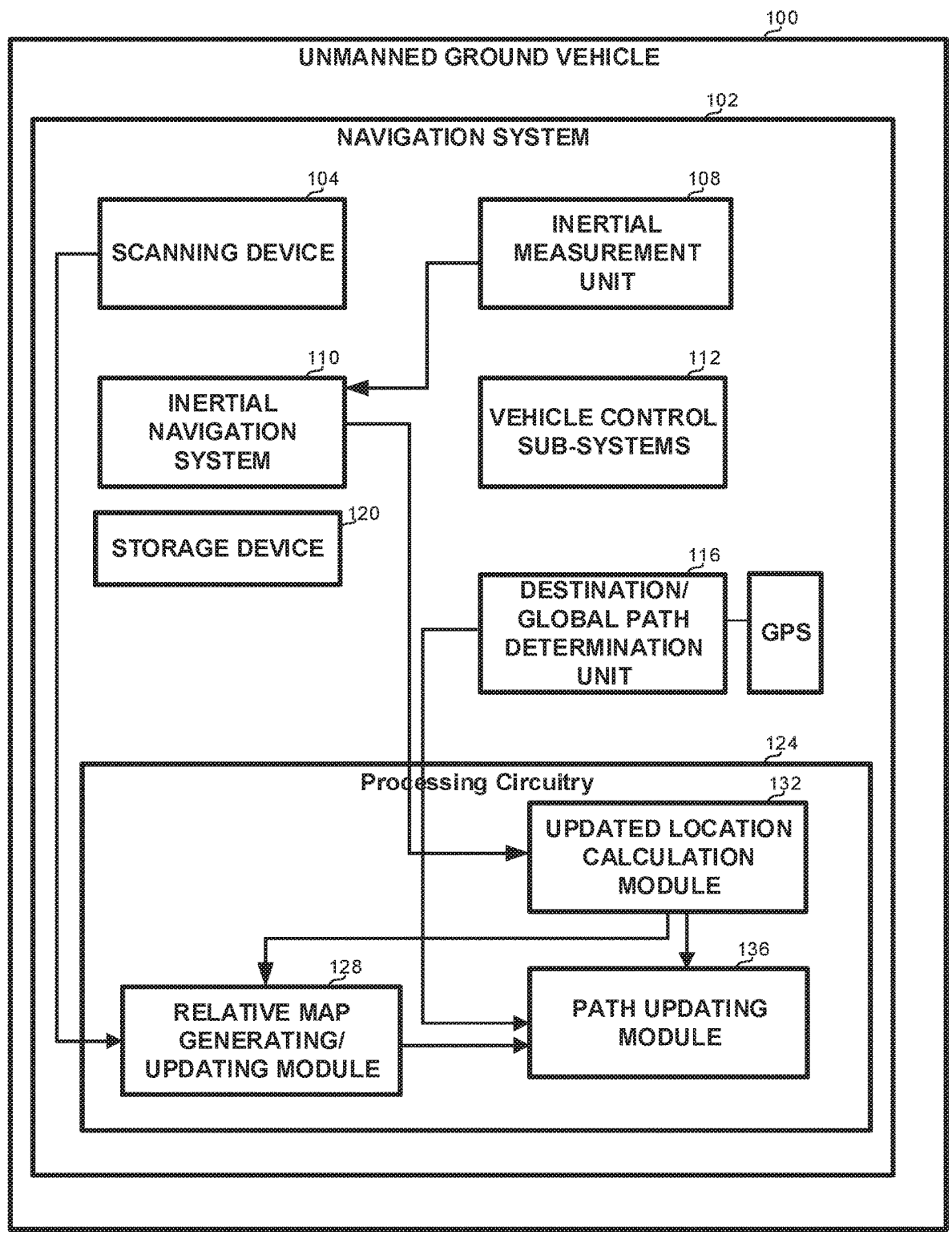
FIG. 1 illustrates a schematic block diagram of a navigation system of a UGV, in accordance with certain examples of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "determining", "representing", "comparing", "generating", "assessing", "matching", "updating", "creating" or the like, refer to the action(s) and/or process(es) of a computer that manipulate and/or transform data into other data, said data represented as physical, such as electronic, quantities and/or said data representing the physical objects.

The terms "computer", "processing unit", "computerized device", or the like should be expansively construed to include any kind of electronic hardware device with a processing circuitry that includes a computer processor as disclosed herein below (e.g., a Central Processing Unit (CPU microprocessor, an electronic circuit, an integrated Circuit (IC), firmware written for or ported to a specific processor such as digital signal processor (DSP), a microcontroller, a field programmable gate array (FPGA), an application specific integrated circuit (ASIC), etc.) and capable of executing computer instructions (e.g. loaded on a computer memory).

The operations in accordance with the teachings herein may be performed by a computer specially constructed for the desired purposes or by a general-purpose computer specially configured for the desired purpose by a computer program stored in a computer readable storage medium. In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

The term "scanning device" as used herein should be expansively construed to include any kind of device configured to identify that an object is present at a specific distance and at a specific direction relative to the device. Examples of scanning devices include, but are not limited to: laser scanners (including LIDAR), RADAR, images sensor, sonar, etc. A scanning device can scan for example, 360° on a plane surrounding the device, or at some other smaller scanning angle (e.g. 180°). Alternatively, the scanning device can scan a sphere or part thereof around the UGV. A scanning device can provide information for generating a 3 dimensional map of the scanned area. In some embodiments, in order to save resources, a 2.5 dimensional map may be generated, as detailed below.

Although the description predominantly refers to an "unmanned ground vehicle" (UGV) this is done by way of non-limiting example only and should not be construed as limiting. As used herein the term UGV is meant to expansively include any kind of vehicle that can be operated either autonomously, by a tele-operator, or by an on-board driver who cannot see the environment and steers in accordance with a map or with explicit steering instructions. Furthermore, although the descriptions refers to a ground vehicle, this is done by way of non-limiting example only and other types of vehicles are also contemplated within its scope. For example, any one of, manned or unmanned aircraft (e.g. unmanned aerial vehicle also known as UAS or drone manned or unmanned marine vehicle (including underwater and above water vehicles), can likewise comprise a navigation system (102) configured to implement the disclosed map generation and navigation technique for avoiding obstacles, as disclosed.

As a specific example, a drone flying at low altitude in an area dense with obstacles (e.g. in a forest or an urban area with buildings and other structures) can be configured to autonomously navigate through the traversed area and avoid obstacles according to the principles disclosed herein. Likewise, an operator controlling such a drone can do so based on a map of the environment generated as disclosed herein. A UGV or any other vehicle configured to operate in accordance with the description is equipped with a scanning device configured to scan the area surrounding the vehicle, and an self-contained navigation system (e.g. INS) configured to provide positioning data of the vehicle.

Furthermore, although the description predominantly refers to an Inertial Navigation System (INS) this is done by way of example only and should not be construed as limiting. The presently disclosed subject matter contemplates any type of self-contained navigation system and/or methodology that is not dependent on external references in order to determine navigation data such as position, orientation or velocity. This is different for example from GPS navigation that is dependent on information obtained from satellites. Other types of self-contained navigation systems include for example. Simultaneous localization and Mapping (SLAM) and odometer navigation systems. Similar to INS, other self-contained navigation systems (SCNS) also suffer from a drift that accumulates as the vehicle advances.

The term "map" as used herein should be expansively construed to include any data structure representing a geographical area. A map may be absolute, i.e., comprise indications of absolute coordinates of an object or a location, or relative, i.e., comprise information about locations or objects, regardless of their locations in absolute coordinates. A map may be represented on a computerized display device, paper or any other tangible medium. In some embodiments of the disclosure, a 2.5 dimensional map may be generated and used. A 2.5 dimensional map relates to a map which indicates the lowest height of an obstacle above the ground, i.e., the vertical distance between the ground and the obstacle at each ground location. In other words, there is provided for each ground location, the height of the free space above the ground. Thus, the information in the map indicates for each location the clearance height for the UGV. For example the lowest height of a treetop or a bridge at a certain point. It will be appreciated that for obstacles that are on the ground, such as a house or a trunk of a tree, this height may be indicated as zero. Thus, for path planning purposes, the clearance height may be taken into account, when determining, for example, whether the UGV can pass under a tree or a bridge.

Reference is now made to FIG. 1, showing a schematic block diagram of a navigation system of a vehicle, exemplified by a UGV, in accordance with some examples of the presently disclosed subject matter.

UGV 100 comprises navigation system 102. It will be appreciated that navigation system 102 can comprise components, some of which may also serve other purposes, and that components of navigation system 102 may be located at different places on UGV 100. Further, navigation system 102 can also receive services from and communicate with other components of UGV 100.

Navigation system 102 can comprise or be otherwise operatively connected to a scanning device 104 configured to scan an area surrounding the vehicle, and provide scanning output data for generating a relative map as further described below.

Navigation system 102 can further comprise or be otherwise operatively connected to IMU 108 providing, inter alia, acceleration data of the UGV, and INS 110 tracking the position, velocity, and orientation of an object based on the IMU output data. In some examples, INS 110 comprises IMU 108 to form a self-contained navigation system which uses measurements provided by IMU 108 to track the position, velocity, and orientation of an object relative to a starting position, orientation, and velocity. As mentioned above, INS is merely an example, and other self-contained navigation systems can be used in addition or instead of INS.

Navigation system 102 can further comprise or be otherwise operatively connected to vehicle control sub-systems 112 including for example steering control unit, gear control unit, throttle control unit, etc. Vehicle control sub-systems 112 can be configured in some examples to receive and/or generate vehicle control instructions (e.g., steering commands)) and control UGV 100 accordingly. The instructions may be absolute or relative, for example an absolute instruction may be "go 20 m north", while a relative instruction may be "continue straight for 20 in" or "gas 30%, yaw rate 50%".

Navigation system 102 can further comprise destination and global path determination unit 116 (implemented for example as a dedicated processing unit or being otherwise operatively connected to a processing unit) for obtaining a destination to which UGV 100 has to arrive and calculating a path to that destination, or obtaining, for example receiving, a path leading to a destination. A path may be provided as a series of waypoints leading from a current location of UGV 100 to a target location. Destination and global path determination unit 116 can comprise or utilize one or more of components such as but not limited to:

Global Positioning System (GPS); communication unit for receiving a location or instructions from an external source; camera and a computerized vision system for capturing images of the environment and identifying in the images a predetermined sign indicating a target destination. The indication can include for example visible or invisible light or a predetermined gesture performed by a person or a machine, or the like.

Thus, for example, navigation system 102 can use a GPS for navigating the vehicle towards a designated destination while obstacle avoidance is executed based on the relative map as further disclosed herein below.

UGV 100 can further comprise computer data storage device 120 for storing information such as one or more maps, information about obstacles, navigation instructions, or the like.

Navigation system 102 can further comprise or be otherwise operatively connected to one or more processing units for controlling and executing various operations, as disclosed herein. Each processing unit comprises a respective processing circuitry comprising at least one computer processor which can be operatively connected to a computer-readable storage device having computer instructions stored thereon to be executed by the computer processor.

According to one example, different functional elements (units, modules) in navigation system 102 can be implemented as a dedicated processing unit comprising dedicated computer processor and computer storage for executing specific operations.

Additionally or alternatively, one or more elements can be operatively connected to a common processing unit configured to execute operations according to instructions stored in the functional elements.

For example, UGV 100 can comprise processing circuitry 124 (e.g. being part of a computer or processing unit) which can be configured to execute several functional modules in accordance with computer-readable instructions stored on a non-transitory computer-readable medium operatively connected to processing circuitry 124, such as memory device 120. For illustrative purposes such functional modules are referred to hereinafter as comprised in the processing circuitry. Notably, in some examples at least part of the processing can be performed by a computer located remotely from the UGV and configured to receive input data from the UGV and provide to the UGV the processing output over a communication link.

Navigation system 102 can comprise by way of example relative map generation and updating module 128, updated location calculation module 132, and path updating module 136.

Updated location calculation module 132 is configured to update the location of UGV 100 based on data, such as change in the location of UGV 100, as determined by INS 110. The location may be relative to a previous location, for example 20 m in a specific direction, and is thus useful in assessing the updated location of UGV 100 on the map, relative to the non-traversable cells in the map.

Relative map generation and updating module 128 is configured to receive readings from scanning device 104 and from updated location calculation module 132, and generate or update a relative map of the UGV surroundings as disclosed further below, including updating the position of elements in the scanned environment relative to the vehicle.

Path updating module 136 is configured to determine a progressing path within the area of the relative amp for directing the vehicle and avoiding obstacles. Path updating module 136 can be further configured to update a global path obtained by destination/global path obtaining unit 116, based on the relative map generated by map generation and updating module 128, such that the updated path circumvents nearby obstacles.

Figure 2:
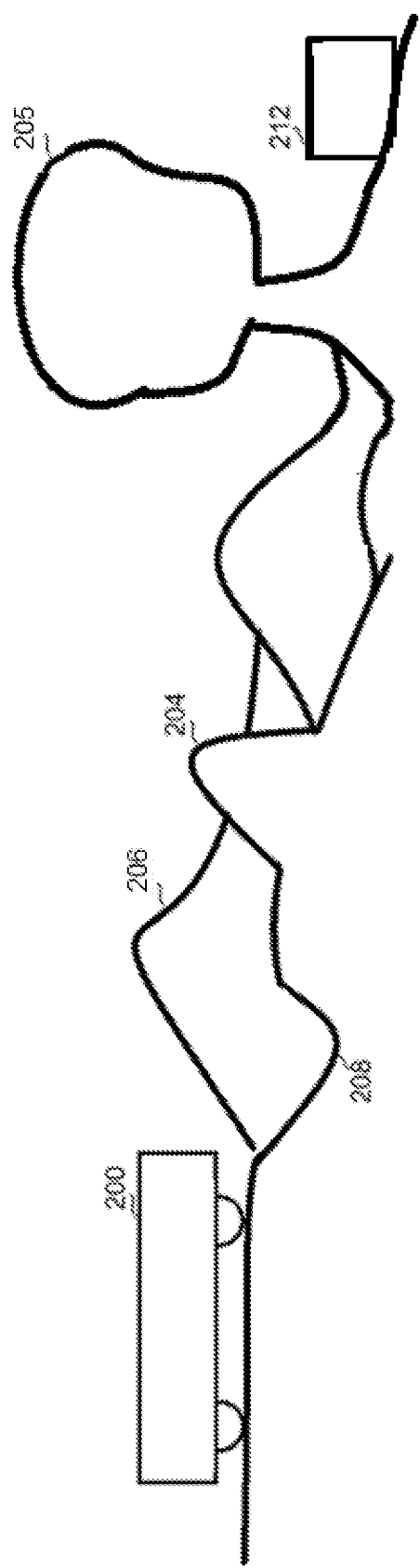
FIG. 2 shows a schematic illustration of an environment in which a UGV has to navigate.

FIG. 2 shows a schematic illustration of an example of an environment in which UGV 200 has to navigate from a current location to target location 212. The environment may comprise obstacles such as positive obstacle 204, which is above ground level, or negative obstacle 208 which is below ground level, overhead obstacle 205 such as a tree or a bridge, steep terrain 206 which may be for example a. back, side or front slope, wherein all obstacles are non-traversable for UGV 200 and have to be avoided. It will be appreciated that some objects present an obstacle when accessed from one side, but not when accessed from another side. For example, a ramp may present an obstacle when accessed from the side, but not when accessed from the front or back.

According to some examples of the presently disclosed subject matter, while a vehicle (e.g. UGV) advances in a certain area it generates in real-time a relative map of the area surrounding the UGV, by repeatedly scanning the area and determining, using a self-contained navigation system (e.g. INS), the position of elements in the scanned environment relative to the UGV. The map is continuously being updated together with the advancement of the UGV and provides a real-time picture of the surrounding environment, which enables to navigate the UGV in the traverse area while avoiding obstacles.

According to one example, navigation of the UGV can be performed by an operator of the UGV. In some examples, the operator can be located onboard the vehicle while in other examples the operator controls the UGV from a remote control station. In either case, the operator can control the UGV based on the relative map (generated for example by module 128) which is displayed on a display device (e.g. computer screen on-board the vehicle operatively connected to navigation system 102) and provides real-time picture of the traversed area near the UGV.

According to another example, the UGV is configured to autonomously navigate towards a target destination, optionally along a predefined (global) path using for example GPS, to use the relative map for detecting nearby obstacles and. generate maneuvering instructions for avoiding the detected obstacles.

Figure 3:
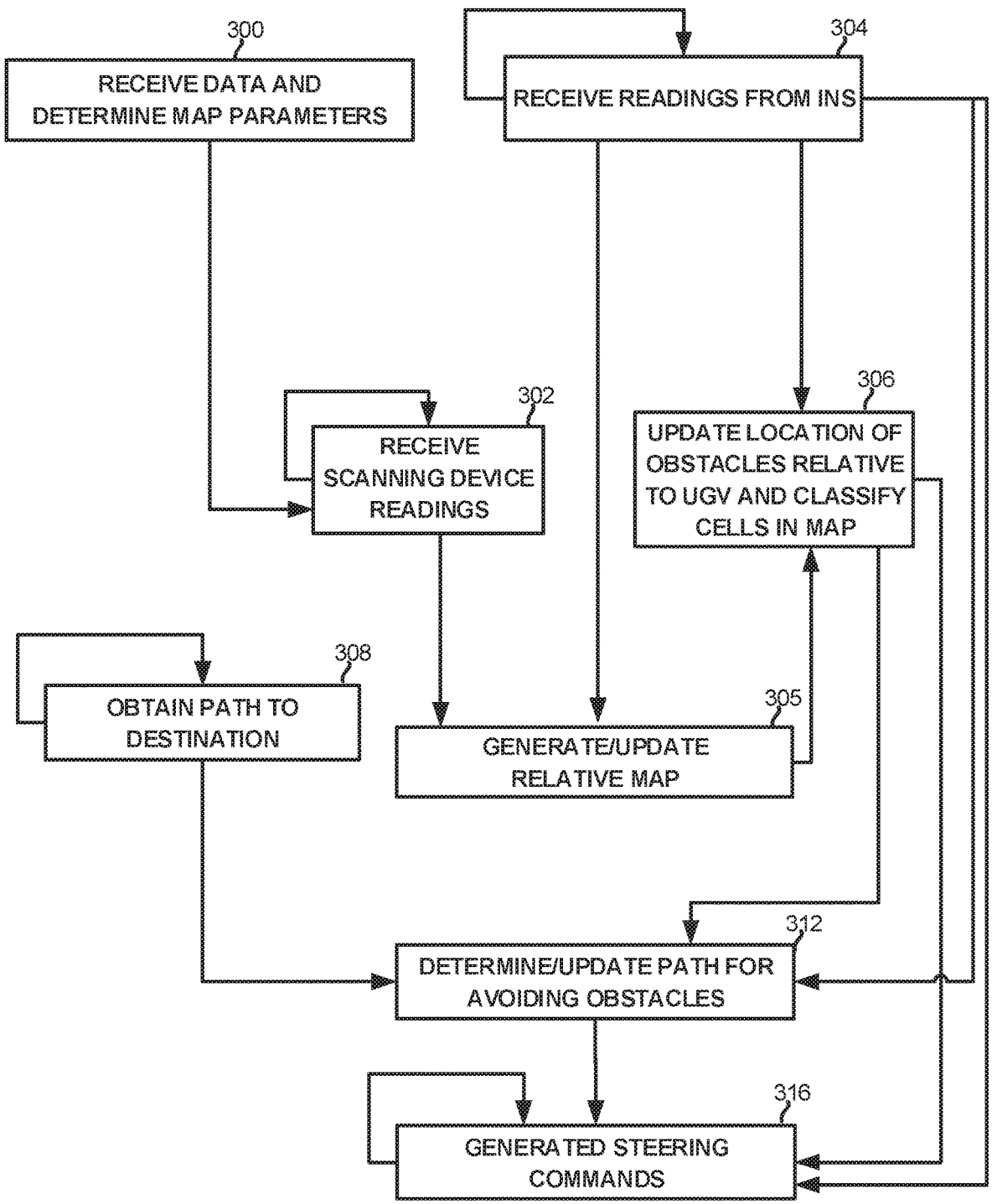
FIG. 3 illustrates a generalized flow-chart of a method for navigating a UGV in the presence of obstacles, in accordance with certain examples of the presently disclosed subject matter.

Reference is now made to FIG. 3, showing a flowchart of operation for navigation within an area according to examples of the presently disclosed subject matter. Operations are described below with reference to elements in FIG. 1, however this is done by way of example only and should not be construed as limiting.

In some examples, information including data characterizing the area to be traversed, as well as the operational parameters of UGV 100 and navigation system 102, is received (block 300). For instance, processing circuitry 124 can receive such information at the onset of vehicle navigation. For example, this information may include, but is not limited to, the size or location of the area to be traversed, obstacle density, UGV maximal or average velocity within the terrain, scanning distance, scanning angle (360° or less) and scanning resolution (every 1°, 1°, etc.) of one or more scanning devices comprised by the UGV, size of the relative map, size of cells dividing the map, or the like. In some example, processing circuitry 124 can be configured to determine map parameters of the relative map, such as the size of the area represented by the map, size of the cells dividing the map, or the like, as detailed below. It will be appreciated that in some examples, the relative map representing the area surrounding the UGV, is square or substantially square (i.e. with some disparity between the lengths of the different edges of the map, e.g. less than 10% difference or less than 5% difference or less than 2.5% difference, etc.). However, in other examples, the relative map may be rectangle, or have some other shape.

At block 302 data is received from a scanner, (e.g. scanning device 104 depicted FIG. 1). The scanner is operated to scan an area around the vehicle (perform a scanning operation) as the vehicle travels through the area and generate scanning output data, comprising readings of distances from the UGV to objects in different directions around the vehicle and transmit the scanning output data to a computer processor (e.g. processing circuitry 124). The scanner is operated to provide the readings repeatedly, at a rate depending on the device capabilities, user settings, or the like. The readings may be received for a full cycle)(360° around the device, or for a smaller angle, such as 180°, 270°, or the like. The readings may be received at a predefined resolution, such as every 0.5°, every 1°, every 1°, or the like, horizontally and vertically. It will be appreciated that scanning output data may be received from multiple scanners operatively connected to the UGV, which may be combined for generating the map.

At block 304, readings are received from a self-contained navigation system such as INS 110 (e.g. received at processing circuitry 124), indicating a current location of the UGV relative to a previous location. The readings may be provided by INS 110 at a rate depending on the capabilities of INS 110, user settings, etc.

At block 305 a relative map of the area of the UGV is generated or updated based on the scanning output data and on the INS data, (e.g, by processing circuitry 124 executing relative map generation/updating module 128). It will be appreciated that the map is initially generated based upon scanning output data received from scanner 104 and INS data received from INS (which includes location and orientation of the UGV at the time of scanning) after which it can be updated based on further scanning output data or on UGV positioning data calculated based on data from INS. Thus, the map may be updated when new readings are received from scanner 104, or when the relative location of the UGV has changed in response to new data received from the INS.

The relative map is accumulative and combines scanning output data from a plurality of scanning operations. In addition to orientation of the UGV obtained from the INS, positioning data of the vehicle obtained from INS is needed in order to determine the current position of the UGV relative to previous map (e.g. relative to the north) and enable the accumulation of scanning output data generated over time in different (e.g. consecutive) scanning operations.

The scanning device reading (scanning output data) generated by the scanner is processed to identify objects and terrain outline and a corresponding map (referred herein also as "initial map") is generated based on the processing output. According to some examples, the height of various objects in the scanned area surrounding the UGV may be determined based on the readings in various vertical directions, thus providing 3-dimensional information for generating a 3-dimensional map, In other examples, e.g. in order to save resources, a 2.5 dimensional map may be generated and used, as mentioned above. The generated map (e.g. 3-D or 2.5-D map) provides a real-time picture of the environment surrounding the UGV from the vantage point of the scanners located on-board the UGV.

According to some examples, the map can be generated and updated such that it is centred around the UGV and the locations of obstacles in the area of the UGV are indicated relative to the UGV. It will be appreciated that map generation may also utilize information obtained from other sources, such as existing roads, areas that can or cannot be traversed, information obtained from image analysis, information indicating whether certain objects are obstacles or not, or the like.

According to one example, the size of the area represented by the map can be determined in accordance with the range and accuracy of the scanning device. For example, a scanning range of 35 m in each direction with accuracy appropriate for the terrain and task, provides for a map representing a square having an edge of double the scanning distance, i.e. 70 m. It will be appreciated, however, that the size of the area of the map may be determined in accordance with additional or different parameters, such as the size of the area to be traversed. SCNS (e.g. INS) drift, or other factors. According to some examples the size of the area is in the order of magnitude of tens of meters, such as between 10 m to 200 m in each dimension (e.g. longitudinal and lateral).

Figure 5:
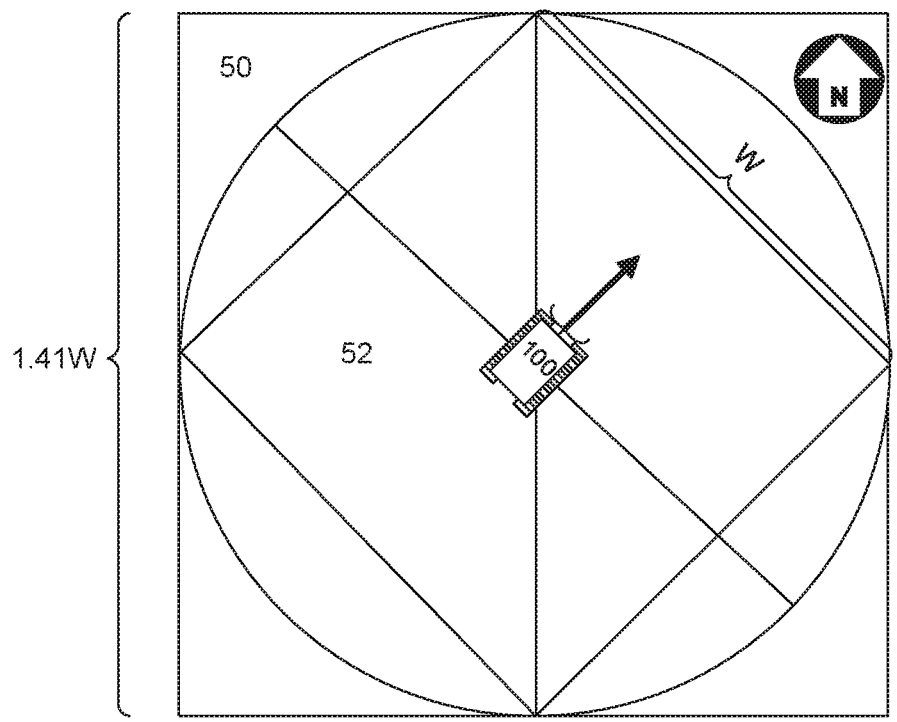
FIG. 5 is a schematic illustration demonstrating principles of the relative map, in accordance with certain examples of the presently disclosed subject matter.

A rectangular (e.g. square) map has the advantage of more easily being divided into equal size cells as compared to other shapes such as a circular map. Thus, as illustrated in FIG. 5, while the scanner circles the vehicle 100, a circumgon square having a rectangular shape defines an outer map (50). The circumcircle of an inner square defines an inner map (52), where the entire area of the inner map is within the mapped area of the scanned circle.

In sonic examples, given a certain size W of the edge of the map (assuming for example a map substantially square), the scanner provides readings of the area around the UGV 100 which are used for defining a circumcircle around the square of the map (i.e. inner map). A circumgon square (outer map) may be defined for the circumcircle with an edge that equals about 1.41 the edge of the inner square. According to some examples, the outer map (which includes the inner map) is oriented with the north. The inner map can then be turned, within the area of the outer map, so it is orientated with the heading of the UGV (e.g. a horizontal ego-sphere map or ego-localized) for the convenience of the users (e.g. operators of the vehicle or path planners). For example, an operator which is navigating the vehicle based on the relative map is provided with the inner map (inner "integrated map") generated as a horizontal map orientated with the heading of the vehicle, thus enabling the operator to easily understand the real-time picture of the surrounding environment relative to the current position of the vehicle.

According to the subject matter disclosed herein, the map is divided into a grid of cells, wherein each cell represents part of the map area. In one example, division of the map into cells can be performed as part of the map generation process (described with reference to block 305). In another example, the division can be performed as part of the classification process described herein below (with reference to block 306). As explained in more detail below the size of the cells dividing the map is determined based on INS drift over a certain predefined distance.

At block 306, the mapping data undergoes a classification process that includes identification of obstacles within the mapped area (e.g, by processing circuitry 124 or by some other dedicated processor implementing some type of object classification algorithm. Once available, the information regarding obstacles in the mapped area is used for classifying the cells dividing the map. Various methods for identifying obstacles in a scanned environment based on scanned output data are known in the art.

One example of an object classification algorithm is described in an article by Procopio, M, J., Mulligan, J., & Grudic, G. (2009), entitled: "Learning Terrain Segmentation With Classifier Ensembles For Autonomous Robot Navigation In Unstructured", Environments. Journal Of Field Robotics, 26(2), 145-175, which is incorporated herein by reference in its entirety). Another example of an object classification algorithm is described in an article by Ribo M. and Pinz A. (2001) entitled "A comparison of three uncertainty calculi for building sonar based occupancy grids", international Journal of Robotics and Automation Systems 35: 201-209. A further example of an object classification algorithm is described in an article by Lin J. Y., and Lee S. (2003) entitled "Consecutive scanning based obstacle detection and probabilistic navigation of mobile robot" IEEE/RSJ International Conference on Intelligent Robots and Systems: 3510-3515.

For convenience, the map generated based on the scanning output data as described above with reference to block 305 can be referred to as "initial map" and the term "integrated map" can be used to refer to the initial map after it has been divided into cells classified as traversable or non-traversable cells. The map data of both the initial map and the integrated map and their continuous map updates can be stored in data storage device (e.g. 120).

Following identification of obstacles within the mapped area, cells dividing the area are classified to one of the at least following classes: non-traversable cells (i.e., representing an area comprising an obstacle or part thereof); and traversable cells (i.e., representing an area not comprising an obstacle or part thereof). Cells encompassing obstacles are classified as non-traversable while cells which are empty of obstacles are classified as traversable. In some examples, a cell may also be classified as unknown.

It will be appreciated that initially all s can be classified as unknown. As the UGV gets closer to areas represented by unknown cells, their class may become clear and they can then be classified into traversable or non-traversable. Additionally, in some examples determining whether an area represented by a cell with unknown class is traversable or not, can be based on the specific, progression path, task to be performed, traversability of the vehicle, type of terrain, or the like.

Thus, while different UGVs travelling in the same area may generate an identical or very similar initial map of the area, each UGV may generate a different integrated map or maps as it may classify different objects and areas within the mapped area as obstacles, depending on its specific progression path(s), its traversability, and so forth.

Figure 4A:
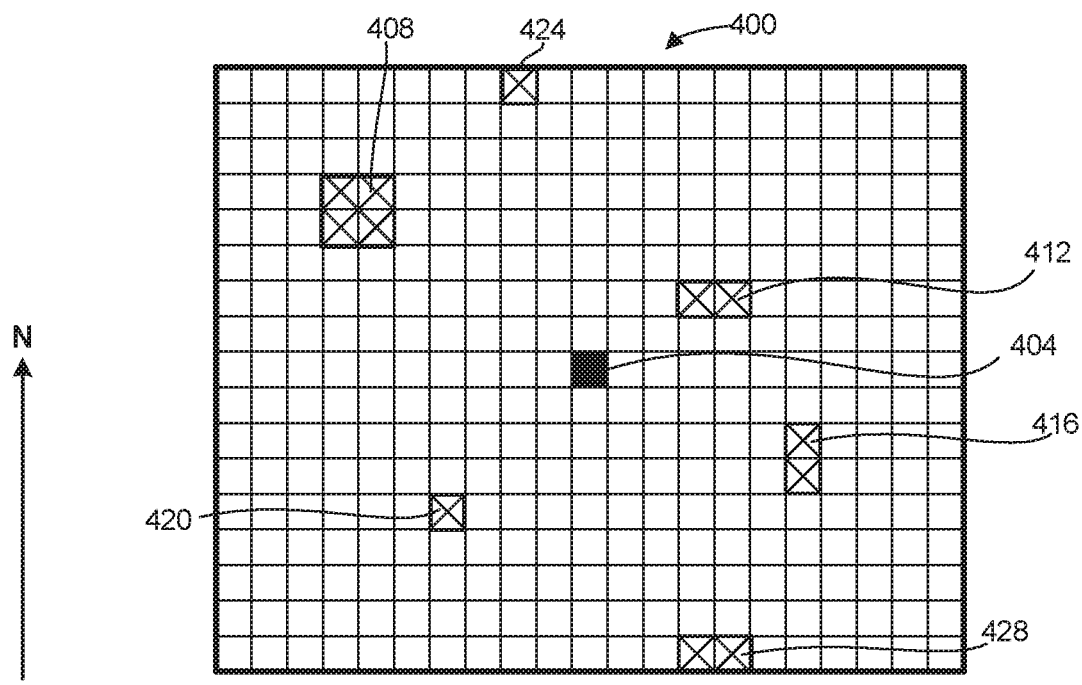
FIG. 4A and FIG. 4B illustrate visual representations of a map of an environment at two points in time, in accordance with certain examples of the presently disclosed subject matter.
Figure 4B:
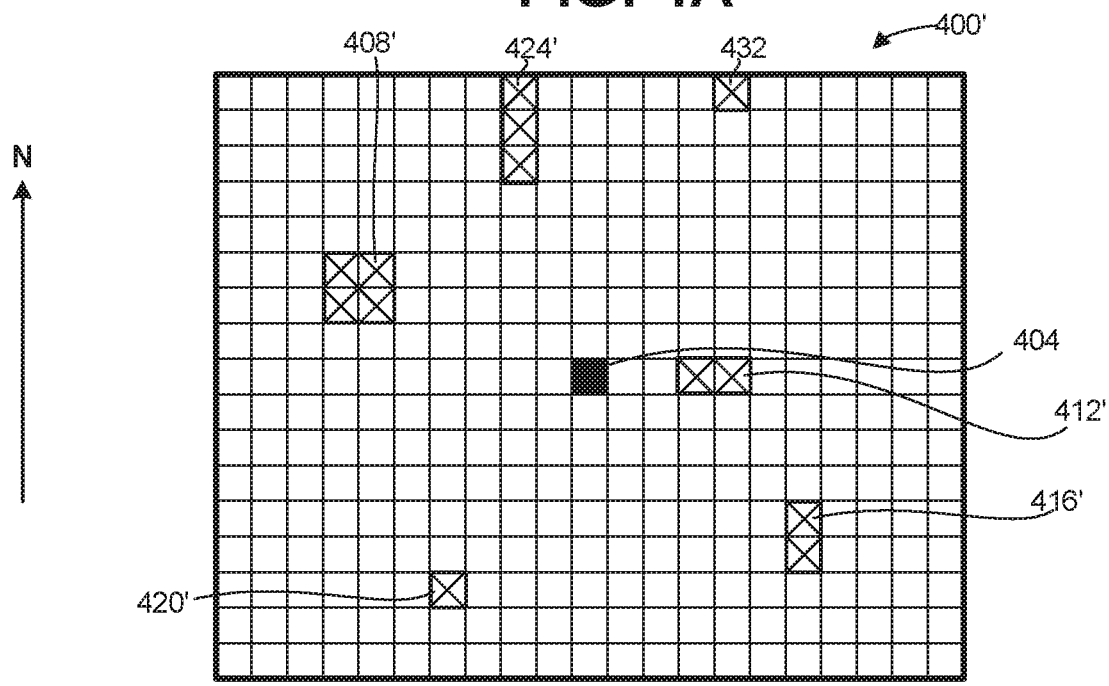

Reference is now made also to FIGS. 4A and 4B that illustrate visual representations of maps of an environment at two points in time, to demonstrate how the relative map is generated and updated as the UGV advances, in accordance with some embodiments of the disclosure. As mentioned above, the maps can be generated/updated (for example by processing circuitry 124, e.g, by relative map generating/updating module 128) based on scanning output provided by scanning device 104 and INS data received from INS 110.

FIG. 4A shows 2D map 400 representing the scanned area at a particular time $t_1$, and FIG. 4B shows 2D map 400', which represents the scanned area at a later time $t_2$. As mentioned above, the relative map is accumulative as new scanning output data is continuously being added to the existing data such that the relative map combines scanning output data from a plurality of scanning operations. Alignment between scanning output data from different (e.g. consecutive) scanning operations is done based on the INS data. As the vehicle proceeds new areas area added to the map and areas that reach the end of the map are excluded from further map updates.

According to the illustrated example, between $t_1$ and $t_2$ the UGV moved to the north a distance represented by two cells of the maps. Thus, map 400' represents an area which has significant overlap but is more northerly relative to the area of map 400. Black square 404 indicates the UGV and is located in both maps at the center of the map, but due to the movement of the UGV to the north between $t_1$ and $t_2$, the obstacles have moved south relative to the UGV. Thus the obstacles represented in map 400' as areas 408', 412', 416' and 420' are shown more southerly as compared to areas 408, 412, 416 and 420 in map 400. The obstacle represented by area 428 of map 400 is not represented in map 400' since it is located in the southern area of map 400 which is not included in map 400'. The obstacle represented by area 424 in map 400, on the other hand, is represented by area 424' wherein a larger part of it is shown in map 400', and area 432 appears at the northern part of map 400'. It will be appreciated that positive and negative obstacles are not depicted differently since both types represent area cells which are non-traversable and which the UGV needs to avoid.

Notably, although obstacles remain at the same locations and the UGV moves relative to the environment, the maps are created relative to the UGV. The maps thus represent the UGV at the same location within the maps while the obstacles are moved in the opposite direction to the direction of movement of the UGV. As mentioned above changes in the position of the UGV relative to the environment is determined based on INS data.

As explained above the map is divided into a grid of cells, which are classified to at least one of the at least following classes: non-traversable cell (i.e., representing an area comprising an obstacle or part thereof); and traversable cell (i.e., representing an area not comprising an obstacle such that the UGV is unable to enter the area or should avoid it for some other reason).

A cell is classified in accordance with the classification of the corresponding area it encompasses within the map. In some examples, an obstacle or any part thereof located within the area of cell, renders the entire cell non-traversable. The entire area of a cell may thus be classified as non-traversable even if an obstacle detected within the area represented by the cell covers only a part of the cell's area, e.g., the size of the obstacle or obstacles or part thereof located within the area represented by the cell is smaller than the entire area of the cell. Therefore, a cell classified as traversable ensures that the area represented by the cell is free of obstacles. As exemplified in FIGS. 4a and 4b all obstacles cover complete cells, i.e. the entirety of each cell is either an obstacle (i.e. non-traversable) or not an obstacle (i.e. traversable).

According to examples of the presently disclosed subject matter, the size of the cells in the map is selected to equal or exceed the maximal accumulated drift of the INS over some distance.

Thus, the cell size provides a safety threshold that protects against navigation errors resulting from INS drift. Larger cells provide for wider safety thresholds, and thus provide for a smaller chance of hitting an obstacle due to erroneous determined vehicle position resulting from the drift. Notably, as the cell size is related to the specific drift of the INS, cell size may differ depending on the specific type of INS which is used and its corresponding drift. Given a certain distance, a more accurate INS allows to use smaller cells as it has less drift over the distance.

The distance upon which the maximal accumulated drift is determined, can be for example, a dimension, such as the edge size of the area depicted by the map (e.g. inner map 52). Alternatively, in a different example the distance may be half of the edge size of the area depicted by the map (e.g. inner map), which is relevant when the UGV is located at the center of the map and can thus travel half the edge size of the area before exiting the mapped area and entering an area of a new/updated map generated based on a more recent scanning output. According to another example the distance can be the length of a diagonal crossing the area of the map from one point (vertex) to an opposite point (vertex), which equals in a square shaped map to about 1.41 times the edge length of the inner map. In another example the distance is equal to half the diagonal length, where in a further example the distance is equal to a diagonal of a rectangle that covers half the inner map area. notably, other distances can be used as well.

When selecting the cell size to be larger than the maximal drift over the distance of half the size of the area represented by the map ensures that the vehicle can advance until the edge of the area represented by the map without colliding with an obstacle. For example, assuming the map size is 70 m by 70 m, a drift of one degree over half the length of the map (35 m) amounts to about 61 cm, (35*tan(1)=0.61). Therefore, if a cell size larger than 61 cm is selected, the presence of an obstacle or part thereof in a cell, makes that cell non-traversable cell, even if the obstacle or part thereof is smaller than 61 cm.

In some examples, cells may be square, but in other embodiments they may have other shapes such as rectangular, in which case the size of each dimension of the cells relates to the maximal drift along the relevant direction over a determined distance.

According to one example cell size is determined in accordance with the map update rate, and the maximal or expected velocity of the UGV. In such case, a distance which the UGV traverses between consecutive map updates can be calculated and from that the drift of the INS over that distance can be derived. The map update rate relates to the scanning rate of the scanner, and the time required for generating/updating the relative map based on the scanning output data, keeping in mind that small cells incur a heavier computational burden. Generally, as the map update rate increases or the velocity decreases, smaller cells may be used.

In further examples, the cell size may be determined in accordance with a ratio between the map size squared expressed, for example, in square meters, and the velocity of the UGV, expressed, for example, in meter per second, multiplied by the INS drift, expressed for example in radian per second.

The fact that an entire cell is classified as non-traversable irrespective of the actual size of the obstacle(s) located within the area of the cell together with the fact that the size of the cell is greater than a maximal accumulated INS drift over a given distance, protects from collision with obstacles which may result from INS drift over the given distance. The accumulated drift over the given distance can induce a navigation error which is smaller than the size of a cell but not greater. Thus, as a result of such error the UGV may deviate from its actual location only within the boundaries of a cell. Since a traversable cell is completely clear of obstacles, deviation within the boundaries of a cell does not pose a risk of collision with an obstacle.

As mentioned above, according to some examples of the presently disclosed subject matter the relative map can be created and updated in an accumulative manner, in which readings are gathered as the UGV advances into the area. Initially, scanning data of areas beyond the scanning range of the scanner, or too close to the scanner, for example in the range of 5 m from the scanner in each direction, is not available for scanning. As the UGV advances, a map of the full area surrounding the UGV, and within the scanning range, becomes available. Once a map of the full area that can be represented by the map is available, the map is updated as new areas are being scanned, as the UGV advances towards these areas. However, peripheral areas in the direction opposite the advancement direction are excluded from the maps as they are being updated.

In some situations, objects may appear or disappear between consecutive map updates. As a result of the accumulative nature of the map that combines scanning output from different (e.g. consecutive) scanning operations, it is required to match (or align) between elements (e.g. detected obstacles) that are detected in an earlier scan and are not detected in a later scan, even when the elements are still located within the area of the map. Disappearance of objects may be due thru example to the geometry of the UGV and the topography of the scanned areas near the UGV. For example, a line of sight from the scanning device to an obstacle that has been identified 10 meters ahead of the UGV in a first scanning operation can be blocked in consecutive scanning operation due to change in the orientation of the UGV resulting from the topography. In other situations, object disappearance may be due to noise, or due to scanning at different angles. For example, one scan may include readings along odd angles (e.g., 1°, 3°, etc.) relative to some direction, while the following scan may include the even angles (e.g., 2°, 4°, etc.). Newly appearing objects can be indicated as non-traversable cells on the newly generated map. In some situations, objects that have disappeared can still be represented as non-traversable cells in one or more further updated maps. For example, when objects are scanned from sonic distance, and then disappear as the UGV gets closer to the objects, the objects may be assumed to remain at their location and are indicated on the map, and may later reappear once the UGV advances further. The locations of such objects relative to the UGV may be determined in accordance with the received INS data, indicating the change in location of the UGV since the last map update. Thus, as mentioned above, INS is utilized for matching between scanning output data obtained in different scanning operations including determining changes in the position of the UGV relative to elements in the scanned environment, which are identified in one scanning operation and not identified in another (e.g. consecutive) scanning operation while still located within the area of the map.

Optionally, in order to save computation time and resources, or due to scanner limitations or area topography, part or all of previously scanned areas are not re-scanned, or the scanning information related to these areas is not processed as consecutive maps that include representation of these areas are generated. Rather the information related to these areas, obtained during previous scans, is maintained and used while updating the map.

As detailed below, the UGV advances in accordance with a map updated using data received from INS 110 and from the scanning device, and can thus avoid obstacles.

Referring now back to FIG. 3, at block 308, according to some examples a global path to a desired destination to which the UGV has to arrive may be obtained.

The global path may be calculated by processing circuitry 124, or received from an external source via a communication module communicating for example over an RF network. A global path may be received in the form of waypoints or advancement instructions.

The global path determination, if required, can include obtaining relative or absolute coordinates of the current location of the UGV and of the destination, and calculating a global path therebetween, using any path planning method that is currently known or will become known in the future. The global path can include one or more waypoints through which the UGV has to pass along the global path. The global path calculation may take into account also data such as existing roads which are to be used or the like. The global path calculation can also take into account locations to be avoided such as existing roads which may be damaged by the UGV.

In some embodiments, the global path can be calculated in association with a destination which is relative to the current location of the UGV. The destination can be obtained by manually or automatically searching and identifying a predetermined sign indicating the target destination. The predetermined sign can be, for example, a pointer emitting visible or invisible light, a location in which a predetermined gesture is performed by a person or a machine, or the like.

It will be appreciated that the examples mentioned above should not he construed as limiting and any other method of obtaining a target and determining a global path from the current location to the destination can be used instead. For example, a global path can be a colored line drawn or painted on a floor inside a structure (indoor navigation), where the vehicle comprises a computerized vision system comprising a camera operatively connected to a processing circuity (e.g. destination/global path determination unit 116) configured to execute image processing. The camera captures image of the colored line and the obtained images are processed by an image processing circuitry using for example well known line detection algorithms (e.g. edge detection, segmentation, etc.).

At block 312, once an updated relative map is available, the map can be used for navigating the vehicle along a progression path within the mapped that avoids detected obstacle. processing circuitry 124. It is noted that is not necessary to navigate along a global path and in various cases the relative map can be used for navigating the vehicle without a global path. For example, an operator can use the relative (e.g. inner "integrated") map for navigating the vehicle. Or in another example, a vehicle can autonomously navigate based on certain predefined rules or other data while using the relative map for avoiding obstacles.

It will be appreciated that if no obstacles exist in the surroundings of the UGV, for example if the cells representing areas expected to be traversed until the next reading, as received from the scanning device, are indicated as traversable, then the path may be used as is, without updates.

It will be appreciated that some objects represent an obstacle when accessed from one side, but not when accessed from another side. For example, a ramp represents an obstacle when accessed from the side of the ramp, but not when accessed from the front or from the back. Thus, according to some examples, identification of obstacles in the map is dependent on a specific progression path of the UGV. Given a certain possible progression path within the area of the relative map (referred to herein also as "progression path" or "local path"), it is determined whether the UGV can traverse the mapped area along that local path. According to some examples, the UGV can simulate a plurality of possible progression paths leading from its current position to a desired location and identify within the mapped area, for each simulated path, the respective obstacles of that path.

Furthermore, where multiple progression paths are simulated, classification of the cells to non-traversable and traversable can be repeated for each of the simulated paths. Thus, the identification of obstacles and classification of cells accordingly can occur as the UGV advances through the area once the progression path or the simulated progression paths are known in real-time.

As the identification of obstacles and classification of cells into traversable cells and non-traversable cells is dependent on the specific progression path of the UGV, in some examples, pronounced obstacles which can be easily initially detected (at block 306) and other obstacles which depend on the specific progression map are identified together with the generation/update of the progression map described with reference to block 312.

Figure 6A:
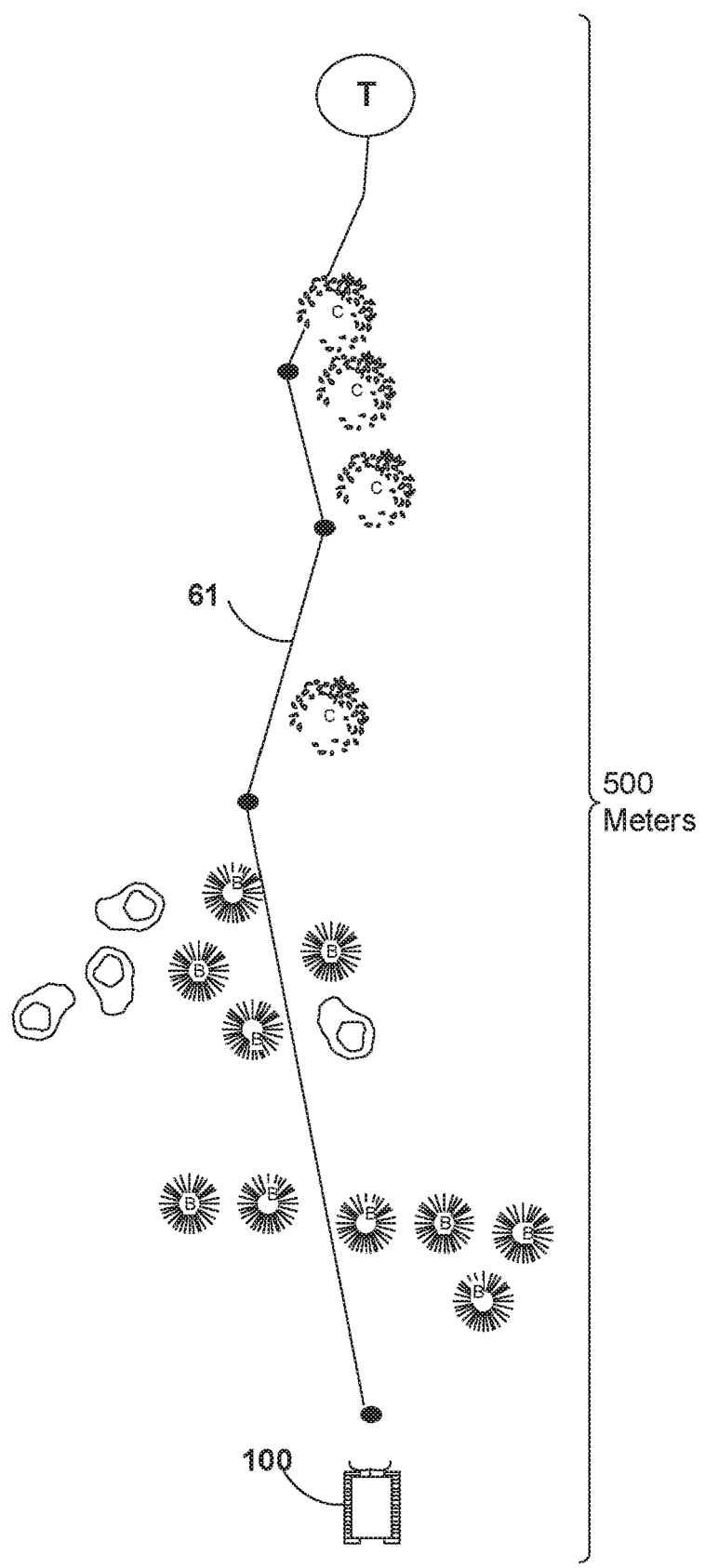
FIG. 6a is a schematic illustration of a global path, in accordance with certain examples of the presently disclosed subject matter.
Figure 6B:
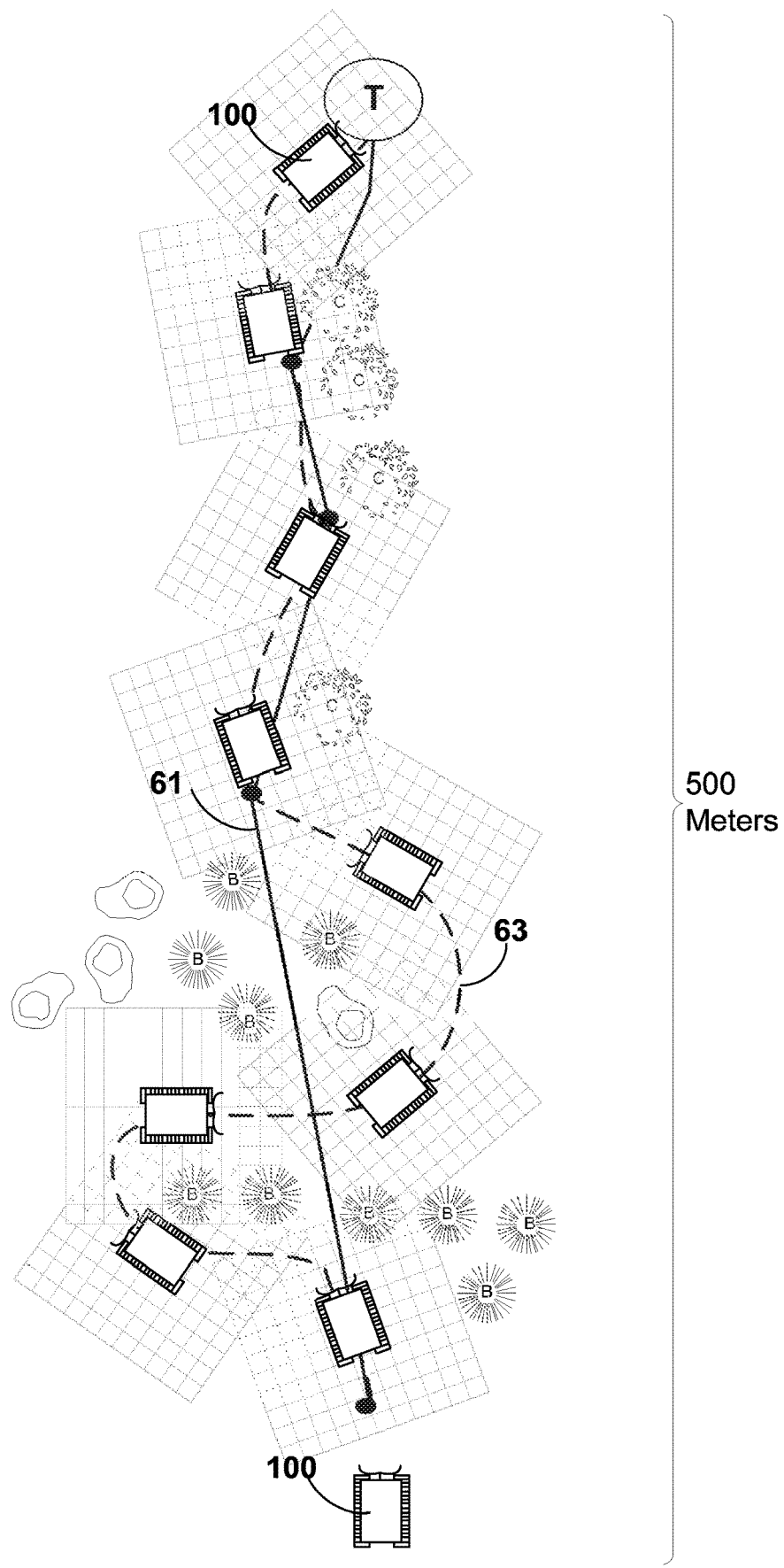
FIG. 6b is a schematic illustration of an updated global path, in accordance with certain examples of the presently disclosed subject matter.
Figure 7:
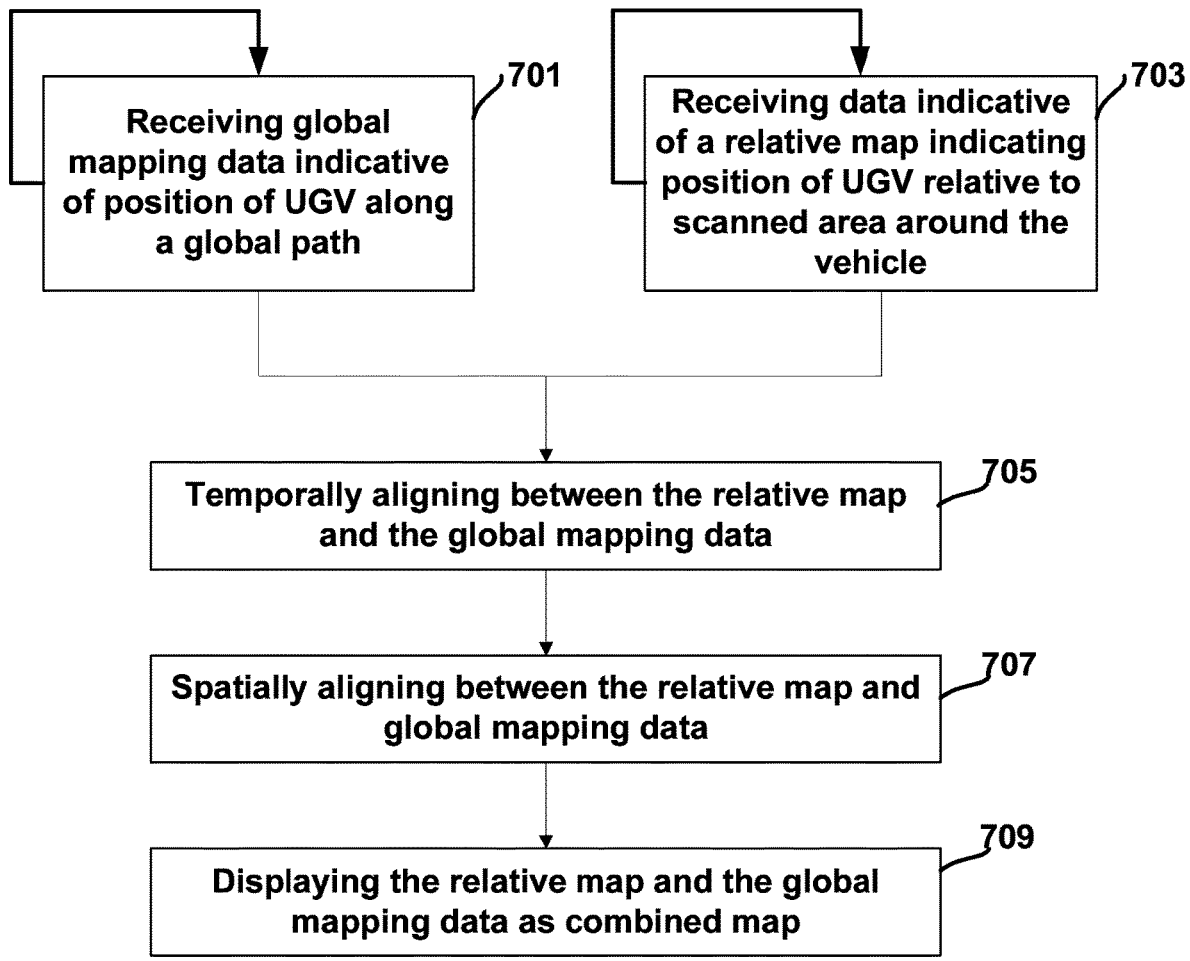
FIG. 7 is a flowchart of operations carried out for generating and displaying a combined map, in accordance with certain examples of the presently disclosed subject matter.

As further demonstrated with reference to FIGS. 6a, 6b and 7, in some examples, where a global path to a certain destination is being followed, the global path is updated based on the progression path determined within the area represented by the map (e.g. by processing circuitry 124 executing path updating module 136). The global path may be determined or updated so as to avoid obstacles indicated by non-traversable cells. The global path determination may also take into account dangerous objects as determined from a 2.5-dimension map, for example steep or otherwise dangerous slopes. Global path determination may also take into account objects such as ramps. As mentioned above ramps may constitute a traversable slope when accessed from one or more directions, for example the ascending or descending direction, and a non-traversable obstacle when accessed from the side, in which direction the ramp constitutes a dangerous slope.

At block 316, vehicle control sub-systems 112 can repeatedly (autonomously) generate steering commands to steer the UGV in accordance with the available relative map along the determined progression path. While at block 312 the integrated map (i.e. after classification of cell to traversable and non-traversable as described with reference block 306) is used for generating or updating a progression path, at block 316 the integrated map can be used during steering of the vehicle in order to avoid collision with obstacles while proceeding along the progression path which has been determined.

In some examples, when the UGV is driven by a driver who cannot see outside the vehicle, instead of providing steering commands, a map with indications of the non-traversable cells, the location of the UGV, and the path to be taken may be shown to the driver, and the driver can steer the vehicle in accordance with the map. For example, the map may be displayed on a display device, and updated whenever updated readings from the scanning device are available, the UGV location is updated based on the INS reading, or a new path is obtained. As mentioned above, the map can be displayed to the operator as a horizontal map orientated with the heading of the vehicle (ego-sphere), thus enabling the operator to easily understand the real-time picture of the surrounding environment relative to the current position of the vehicle. Furthermore, in some examples a map can be displayed to the operator as a 3 dimensional or 2.5 dimensional map with a certain field of view in the direction of the heading thus, providing the operator with a graphical simulation of the surrounding environment.

In some embodiments, INS readings may be received more often than scanner readings. Since the map is generated based on the scanner readings, the same map may be used a number of times, wherein the cells and the steering instructions are updated in accordance with the INS readings which provide updated information.

It will be appreciated that any two or more of the cycles of obtaining the destination or the path, receiving the scanning device readings, receiving the INS data and generating steering commands, may or may not be synchronized. By way of a non-limiting example, the destination or path may be obtained every 10 milliseconds or more, e.g., 100 milliseconds. However, in some tasks, for example when communication is unavailable, the destination or path may be updated every few minutes or even less frequently. By way of a non-limiting example, the scanning device readings may be obtained every 10-500 milliseconds, e.g., 25 milliseconds, and the IMU readings may be obtained every 2-50 milliseconds, e.g., 20 milliseconds. Steering commands may be issued for example at 2-20 Hz.

Thus, the order in which the steps of the flowchart of FIG. 3 are performed may change, for example they may be interleaved or executed concurrently, and is not limited to the order as shown.

FIG. 6a is a schematic illustration, in top view, demonstrating a global path 61 leading vehicle 100 from its current position to a target destination T. The illustrated path comprises a series of waypoints indicated by black circles. As can be seen in the illustration there are various obstacles (e.g. trees, boulders) along the path that restrict the advancement of the UGV. As disclosed herein, and schematically illustration in FIG. 6b, as the UGV proceeds along the global path it continuously generates and updates a relative map based on scanning output data and INS data. As mentioned above, the map provides a real-time picture of the environment surrounding the UGV and specifically is indicative of obstacle and their position relative to the UGV. The UGV is thus enabled to determine a progression path (local path) within the area of the relative map and travel according to the determined progression path in the direction of the target destination while avoiding obstacles. Thus, as shown in FIG. 6b progression paths determined based on the continuous updates of the relative map effectively update global path 61 as indicated by the broken line 63. FIG. 6b, shows UGV 100 and respective relative (ego-sphere) maps at various positions along the way from the starting point to the target destination T.

As explained above in some examples navigation along a global path leading to a designated destination is executed by GPS (located on-board the UGV) used for navigating according to absolute coordinates, while obstacle avoidance is executed based on the relative map which is being continuously generated. As further mentioned above, a global path can be determined by other means.

Thus, as mentioned above with reference to blocks 308 and 312 in some examples, two maps are generated for navigating the vehicle: A global map indicating a global path to a desired destination (followed according to absolute coordinates or some other technique) and a relative map (or integrated map), covering a certain limited area around the UGV, and indicating the position of obstacles in the traversed area relative to the UGV.

In order to enable navigation of the vehicle based on the global path, while avoiding obstacles according to the relative map, the global map and relative map are aligned. For example, system 102, (e.g. with the help of path updating module 136) can be configured to receive GPS data indicative of the position of the UGV in absolute coordinates indicating its position relative to a global path leading to a desired destination and the relative map indicating the position of obstacles relative to the UGV, align one with the other and provide the combined information to vehicle control sub-system to enable the generation of appropriate navigation instructions for autonomously navigating the vehicle. Alternatively or additionally, the combined information can be displayed as a combined map on a display device. Thus enabling an operator to visually monitor the progress of an autonomously navigating vehicle and/or to enable an operator to control the vehicle based on the combined maps which are displayed.

System 102 is further configured to dynamically update the combined map according to updates in the global map and the relative map that occur as the vehicle advances along the global path and display the FIG. 7 is a flowchart of operations carried out for generating, updating and displaying a combined map, according to some examples of the presently disclosed subject matter. Operations described with reference to FIG. 7 can be executed for example by a dedicated processing circuitry in navigation system 102. According to other examples, these operations can be executed at a remote computerized device located for example at a control station. As the UGV advances through the area the relevant mapping data is transmitted to the control station. Responsive to receiving from the UGV the mapping data, the combined map is generated and/or updated and displayed on a display device at the control device.

At block 701 data indicative of the current position of the UGV relative to a global map that comprises at least a global path leading to a target destination is received. This information can be obtained for example, from destination/global path determination unit 116. The operations described with reference to block 701 overlaps with the operations described above with reference to block 308.

At block 703 data indicative of recent updates to the relative map is received (e.g. at module 136). This information can obtained for example, from relative map generation/update module 128. The operations described with reference to block 703 overlaps with the operations described above with reference to block 306.

The mapping data with respect to the global map and the relative map is repeatedly received as the vehicle progresses and the mapping data is updated.

Notably, since the update rate of the relative map may be different than the update rate of the global map alignment between the two maps requires specific synchronization. For example, assuming the GPS data is updated twice in every second (2 Hertz) and the relative map is updated 10 times in every second (10 Hertz), it is needed to synchronize between relative map updates and global map updates. Thus, according to some examples a first time stamp is added to each update of the relative map and a second time stamp is added to each updated of the global map. The first and second time stamps indicate the time the data used for updating the map was obtained from the relevant sensors (including for example, the scanning device and INS for the relative map, and GPS or image sensor for the global map). Time tags can be added to the data as part of the data generation process. For example, time tags can be added to the relative map by processing circuitry 124 as part of the relative map generation or update process. Time tags can be added to the global map by destination/global path obtaining unit 116.

At block 705, temporal alignment between an updated of the relative map and an update of the global map is performed based on the time tags assigned to the relative map and the global map. For example, data indicative of the absolute coordinates of the UGV (e.g. as received from GPS) is matched to the respective relative map based on the time stamp given to the absolute coordinates readings and the time stamp given to the scanning device reading and INS readings used for generating the relative map.

At block 707, spatial alignment between the relative map (e.g. inner map) and the global map is executed by matching between the global coordinates (determined by the GPS) indicating the position of the WV in the global map and local coordinates (determined by the INS) indicating the position of the UGV in the relative map. Thus, the position of the UGV in the two maps is used as a reference point for spatially aligning the two maps and thereby generating a combined map.

In some examples, the operations described with reference to blocks 705 and 707 can be executed as part of the operations described above with reference to block 312.

In some examples, at block 709, the combined map is displayed on a display device, e.g. a display device at a control station to enable monitoring the vehicle as it progresses along the path to its destination. As the vehicle advances the two maps are maintained in alignment and the displayed data is being continuously and dynamically updated in accordance with the newly generated mapping data.

It is noted that the teachings of the presently disclosed subject matter are not bound by that described with reference to FIG. 3 and the components described with reference to FIG. 1. Equivalent and/or modified functionality can be consolidated or divided in another manner and can be implemented in any appropriate order or combination of software, firmware and hardware and executed on a suitable device.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of autonomously navigating a vehicle, the vehicle including a scanning device and a self-contained navigation system (SCNS) being operatively connected to a computer, the method comprising:
    operating the scanning device for repeatedly executing a scanning operation, where each scanning operation includes scanning an area surrounding the vehicle to thereby generate respective scanning output data;
    operating the computer for generating, based on the scanning output data from multiple scanning operations, a relative map representing at least a part of the area, the relative map having known dimensions and being relative to a position of the vehicle, wherein the relative map comprises cells, each of the cells being classified to a class selected from at least two classes, comprising traversable and non-traversable, and characterized by dimensions equal or larger than an accumulated drift value of the SCNS over a predefined distance; wherein non-traversable cells correspond to obstacles identified in the scanning output data;
    receiving SCNS data and updating the position of the vehicle relative to the cells based on the SCNS data.

2. The method of claim 1, wherein updating the position of the vehicle relative to the cells based on the SCNS data includes updating the position of the vehicle relative to obstacles detected in scanning output data of a previous scanning operation from the multiple scanning operations and not detected in scanning output data of a later scanning operation from the multiple scanning operations, while at least one of the obstacles is still located within an area of the map.

3. The method of claim 1, further comprising: generating instructions for controlling the vehicle within the area based on the relative map and the SCNS data, to thereby avoid non-traversable cells.

4. The method of claim 1, wherein the SCNS includes an inertial navigation system.

5. The method of claim 1, wherein the generating of the relative map based on the scanning output data from multiple scanning operations comprises: using the SCNS data for combining the scanning output data from the multiple scanning operations into the relative map.

6. The method of claim 1, further comprising:
    navigating the vehicle within an area represented by the relative map while avoiding non-traversable cells based on the relative map and the SCNS data, while navigating the vehicle along a global path leading to a target destination using at least one navigation technique other than the SCNS.

7. The method of claim 6, further comprising, aligning between the global path leading to the destination and the relative map thereby providing a combined map leading to the destination that comprises a global path which is being continuously updated based on the relative map.

8. The method of claim 7, wherein aligning between the global map and the relative map comprises:
    using time tags for temporally aligning between an update of the global map and an updated of the relative map; and spatially aligning between the global map and the relative map by matching between the position of the vehicle in the global map and the position of the vehicle in the relative map.

9. The method of claim 6, wherein the navigation within the area represented by the relative map while avoiding non-traversable cells is without GPS.

10. The method of claim 6, wherein the other navigation technique includes one or more of: GPS or computer vision.

11. The method of claim 1, wherein the predefined distance is determined in accordance with a relation between an update rate of the relative map, and a maximal or expected velocity of the vehicle.

12. The method of claim 1, wherein a non-traversable cell representing an obstacle that is detected in a scan and is not detected in at least one subsequent scans, is indicated on the relative map as non-traversable, for at least, one further map update.

13. The method of claim 1, further comprising:
generating a graphical representation of the relative map and displaying the graphical representation on a display device to thereby enable an operator to control the vehicle while avoiding obstacles based on the graphical representation.

14. The method of claim 1, wherein the predefined distance is derived from one or more dimensions of the map.

15. The method of claim 14, wherein the predefined distance is equal to one of:
a size of an edge of the area represented by the relative map;
a half of a size of an edge of the area represented by the relative map; or
a diagonal connecting opposite vertexes of the relative map.

16. The method of claim 1, wherein the SCNS is an inertial navigation system.

17. A system mountable on a vehicle for autonomous navigation, the system comprising:
a scanning device for scanning an area surrounding the vehicle to thereby provide scanning output data; and
a self-contained navigation system (SCNS) for providing data indicative of a current position of the vehicle relative to a previous position; and at least one processor;
wherein the scanning device is operable to repeatedly execute a scanning operation, where each scanning operation includes scanning an area surrounding the vehicle, to thereby generate respective scanning output data;
wherein the at least one processor is configured to:
generate, based on the scanning output data from multiple scanning operations, a map representing at least a part of the area, the map having known dimensions and being relative to a position of the vehicle, wherein the map comprises cells, each cell is classified to a class selected from a group comprising of traversable and non-traversable, and
characterized by dimensions equal or larger than an accumulated drift value of the SCNS over a predefined distance; wherein non-traversable cells correspond to obstacles identified in the scanning output data; and
receive SCNS data and update a position of the vehicle relative to the cells based on the SCNS data.

18. The system of claim 17, wherein updating a position of the vehicle relative to the cells based on the SCNS data includes updating the position of the vehicle relative to non-traversable cells indicative of obstacles detected in scanning output data of a previous scanning operation from the multiple scanning operations and not detected in scanning output data of a later scanning operation from the multiple scanning operations, while at least one of the obstacles is still located within an area of the map.

19. The system of claim 17, wherein the at least one processor is configured to generate instructions for controlling the vehicle within the area based on the position of the vehicle relative to the cells, to thereby avoid non-traversable cells.

20. The system of claim 17, is configured to navigate the vehicle within an area represented by the relative map while avoiding non-traversable cells based on the relative map and the SCNS data, while navigating the vehicle along a global path leading to a target destination using at least one navigation technique other than the SCNS.

21. The system of claim 20, wherein the at least one processor is further configured to: align between the global path and the relative map thereby providing a combined map leading to the target destination that comprises the global path which has been updated based on the relative map.

22. The system of claim 20, wherein the other navigation technique includes one or more of: GPS; and
computer vision.

23. The system of claim 20 is configured to navigate within the are represented by the relative map while avoiding non-traversable cells without GPS.

24. The system of claim 17, wherein the vehicle is any one of: unmanned ground vehicle; manned ground vehicle; unmanned aerial vehicle; manned aerial vehicle; unmanned marine vehicle; manned marine vehicle.

25. The system of claim 17, wherein the predefined distance is derived from one or more dimensions of the map.

26. The system of claim 17, wherein the at least one process is configured for generating of the relative map based on the scanning output data from multiple scanning operations, to: use the SCNS data for combining the scanning output data from the multiple scanning operations into the relative map.

27. The system of claim 17, wherein the SCNS is an inertial navigation system.

28. A vehicle capable of autonomous navigation comprising:
a system including:
a scanning device for scanning an area surrounding the vehicle, to thereby provide scanning output data providing information about distances between objects in the area and the vehicle in a multiplicity of directions; and
a self-contained navigation system (SCNS) for providing data indicative of a current position of the vehicle relative to a previous position; and at least one processor;
wherein the scanning device is operable to repeatedly execute a scanning operation, where each scanning operation includes scanning an area surrounding the vehicle, to thereby generate respective scanning output data;
wherein the at least one processor is configured to:
generate, based on the scanning output data from multiple scanning operations, a map representing at least a part of the area, the map having known dimensions and being relative to a position of the vehicle, wherein the map comprises cells, each cell is classified to a class selected from a group consisting of traversable and non-traversable, and characterized by dimensions equal or larger than an accumulated drift value of the SCNS over a predefined distance;

wherein non-traversable cells correspond to obstacles identified in the scanning output data; and receive SCNS data and update a position of the vehicle relative to the cells based on the SCNS data.

29. The vehicle of claim 28, wherein the predefined distance is derived from one or more dimensions of the map.

30. The vehicle of claim 28, wherein the SCNS is an inertial navigation system.

31. A non-transitory computer program product comprising a computer readable storage medium retaining program instructions, which program instructions when read by a processor, cause the processor to perform a method of navigation a vehicle, the method comprising:

receiving scanning output data, generated in multiple scanning operations executed by a scanning device located on-board the vehicle and operable to scan an area surrounding the vehicle;

using the scanning output data for generating, a relative map representing at least a part of the area, the relative map having known dimensions and being relative to a position of the vehicle, wherein the relative map comprises cells, each cell being classified to a class selected from at least two classes, comprising traversable and non-traversable, and characterized by dimensions equal or larger than an accumulated drift value of over a predefined distance a self contained navigation system (SCNS) located onboard the vehicle;

wherein non-traversable cells correspond to obstacles identified in the scanning output data; receiving SCNS data and updating theft position of the vehicle relative to the cells based on the SCNS data.

32. The computer program product of claim 31, wherein the predefined distance is derived from one or more dimensions of the map.

* * * * *

UNITED STATES PATENT AND TRADEMARK OFFICE
CERTIFICATE OF CORRECTION

| | |
|---|---|
| PATENT NO. | : 11,513,526 B2 |
| APPLICATION NO. | : 16/973843 |
| DATED | : November 29, 2022 |
| INVENTOR(S) | : Dina Appelman et al. |

It is certified that error appears in the above-identified patent and that said Letters Patent is hereby corrected as shown below:

In the Claims

Column 24, Claim 23, Line 27, delete "within the are" and insert -- within the area -- represented.

Column 26, Claim 31, Line 13, delete "updating theft position of the vehicle" and insert -- updating the position of the vehicle. --.

Signed and Sealed this
Twentieth Day of August, 2024

Katherine Kelly Vidal
*Director of the United States Patent and Trademark Office*